UNITED STATES PATENT OFFICE.

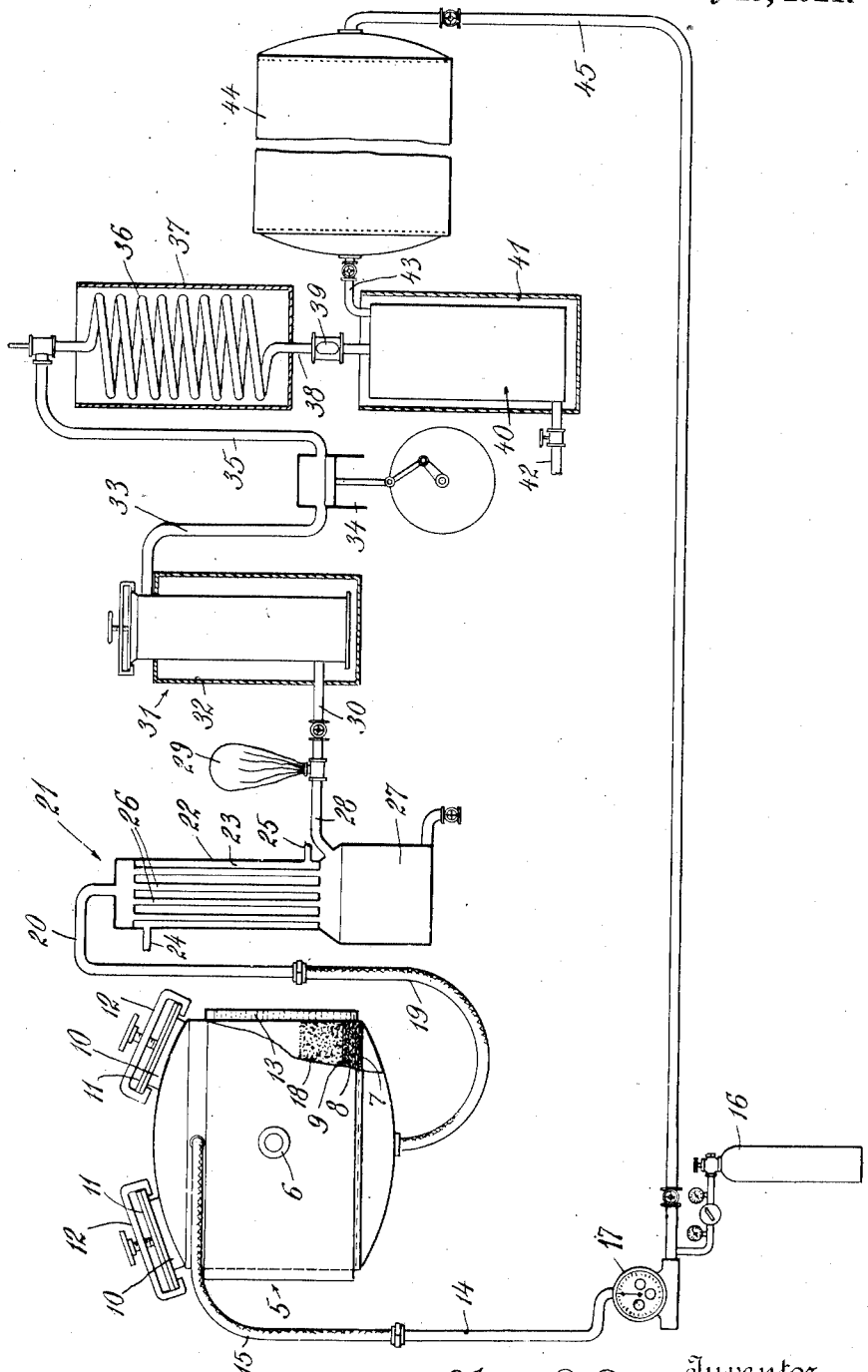

FLOYD J. METZGER, OF NEW YORK, N. Y., ASSIGNOR TO AIR REDUCTION COMPANY, INC., A CORPORATION OF NEW YORK.

PRODUCTION OF HYDROCYANIC ACID.

1,385,336.　　　　Specification of Letters Patent.　　Patented July 19, 1921.

Application filed August 14, 1919. Serial No. 317,440.

*To all whom it may concern:*

Be it known that I, FLOYD J. METZGER, a citizen of the United States, residing at New York city, in the county of New York, State of New York, have invented certain new and useful Improvements in the Production of Hydrocyanic Acid; and I do hereby declare the following to be a full, clear, and exact description of the invention, such as will enable others skilled in the art to which it appertains to make and use the same.

This invention relates to the production of hydrocyanic acid from more or less pure materials, such for example, as chemically or commercially pure cyanids, or from cyanid-containing materials resulting from the fixation of nitrogen. The hydrocyanic acid produced in accordance with the process may be utilized, as such, for numerous purposes, or it may be converted into various cyanogen compounds.

The primary objects of the invention are the production of hydrocyanic acid in a relatively inexpensive and effective manner and in a condition for commercial utilization, and the recovery of hydrocyanic acid and cyanids from crude materials produced in various ways and containing cyanids.

Further objects and advantages of my invention will be apparent as it is better understood by reference to the following specification when read in connection with the accompanying drawing, in which I have diagrammatically illustrated an apparatus adapted for use in the application of the invention.

Hydrocyanic acid is widely employed as a disinfecting material, and particularly as an insecticide for trees and shrubbery. Commonly the gaseous hydrocyanic acid is released in a room, or within a suitable inclosure surrounding a tree, by treating an alkali metal cyanid, such as commercial sodium cyanid, with an acid such as sulfuric acid. This method of application involves numerous disadvantages. For example, it is extremely hazardous to permit ordinary workmen to carry out the necessary operation, because of the toxic character of the hydrocyanic acid gas. Furthermore, the yield of gaseous acid resulting from the reaction does not exceed 75% of the theoretical, and under normal conditions not more than approximately 50% of the acid is available in disinfecting fruit trees where heat and other means tending to increase the yield, cannot be advantageously applied.

I have discovered that hydrocyanic acid may be produced simply and cheaply, with a degree of efficiency approaching theoretical recovery, from relatively pure or crude cyanid-bearing materials, thus rendering the hydrocyanic acid readily available in substantially pure form for various uses. My invention may thus be utilized solely for the purpose of producing hydrocyanic acid from pure or crude material or it may be utilized in the recovery of relatively pure cyanid, from crude materials containing cyanid, the hydrocyanic acid first liberated being recombined, for example, with alkali metal hydroxids to produce the desired alkali metal cyanid.

The invention broadly, involves the formation of hydrocyanic acid from cyanid-containing materials by decomposing said materials with carbon dioxid applied under suitable and regulated conditions. It has been previously known that carbon dioxid will react with alkali metal cyanids in the presence of moisture, to produce hydrocyanic acid. The yield of hydrocyanic acid is, however, under ordinary working conditions extremely small. When carbon dioxid is passed over an alkali metal cyanid in the presence of moisture, heat is developed in considerable quantity. The hydrocyanic acid produced is polymerized nearly as rapidly as it is liberated and the polymer remains in the cyanid material, substantially no hydrocyanic acid being liberated. Under normal conditions, therefore, not more than a few per cent. of the theoretical amount of hydrocyanic acid will be recovered.

In my copending application Serial No. 294,377, I have described a method of liberating hydrocyanic acid from cyanid-containing material by the action of carbon dioxid, whereby the difficulties above referred to are successfully overcome. This method involves the careful regulation of the temperature of the mass during the reaction.

I have now discovered that the same result may be readily accomplished, disregarding temperature conditions, by accelerating the removal of the end products of the reaction, and that a substantially theoretical yield results when the end product is withdrawn with sufficient rapidity. My invention contemplates, therefore, the introduction of carbon dioxid to the cyanid-containing materials and the withdrawal of the hydrocyanic acid at such a rate that the acid formed is not substantially permitted to polymerize. Under these conditions the temperature attained by the mass during the reaction is of no particular moment and no attempt need be made to regulate the temperature in the manner described in my copending application above identified.

I ascribe the results accomplished through the application of my invention to the fact that a certain time interval is required to permit the hydrocyanic acid to polymerize. By accelerating the withdrawal of end products of the reaction, the time interval, during which the hydrocyanic acid formed remains in the reaction zone, is so limited that substantially no polymerization occurs, the hydrocyanic acid being withdrawn from the reaction zone as rapidly as it is released.

The reactions taking place in the production of hydrocyanic acid in accordance with my invention may be represented as follows:

(1) $2NaCN + CO_2 + H_2O \rightarrow Na_2CO_3 + 2HCN$

This reaction may be followed by secondary reactions depending upon conditions. For example, carbon dioxid passing over moist sodium carbonate at low temperatures results in the formation of a certain amount of bicarbonate as follows:

(2) $Na_2CO_3 + CO_2 + H_2O \rightarrow 2NaHCO_3$

This requires a larger quantity of carbon dioxid to complete the reaction, but does not affect the yield of hydrocyanic acid. At higher temperatures, for example, in the neighborhood of 130° to 140° C., no bicarbonate is formed and as the temperature of the reaction tends to approach the higher limit, the amount of bicarbonate will be limited. If the material contains caustic soda or potash, the carbon dioxid will react therewith to form alkali metal carbonates. A theoretical quantity of carbon dioxid somewhat exceeding that indicated by reaction (1) is thus required. In practical operation I employ from one and one-half to three times the theoretical quantity of carbon dioxid necessary to release the hydrocyanic acid, to convert caustic alkali and to change a portion of the normal carbonate to bicarbonate.

The method will be best understood by reference to the accompanying drawing illustrating an apparatus adapted for carrying out the invention. The invention is not, however, dependent upon any particular type of apparatus and the latter may be varied and substantially modified, without affecting the invention or the accomplishment of the desired purpose.

Referring to the drawing, 5 indicates a reaction chamber, which in the particular embodiment disclosed, is a cylindrical converter supported on trunnion 6, about which it may be rotated to permit discharge of the material after treatment. The reaction chamber is provided near its bottom with a screen 7, of any suitable character, but preferably consisting of a metal sheet perforated with one-quarter inch holes on one-half inch centers. Upon the screen several layers of wire mesh fabric 8 are disposed and a sheet of porous material, such as a filter cloth 9 of Monel metal or other suitable material, covers the fabric 8 and serves to support the charge to be treated. The arrangement described insures a more uniform distribution of the gas through the charge. The closed chamber is provided with manholes 10, having suitable closures 11, held in place by yokes 12, so that the chamber may be readily charged and discharged. A water jacket 13 may be provided. The function of the water jacket is merely to cool the walls of the chamber prior to the insertion of a new charge, no attempt being made in the present process to regulate the temperature of the material by external or indirect means during the reaction. Carbon dioxid is introduced from a pipe 14 through a flexible connection 15 to the upper part of the reaction chamber, the carbon dioxid being supplied, for example, from a cylinder 16, through a suitable meter 17, so that the quantity of gas may be easily regulated. Obviously other sources of carbon dioxid may be utilized, as, for example, flue gases.

A layer 18 of the material to be treated is disposed upon the filter cloth 9 and the carbon dioxid introduced under a suitable pressure is forced downwardly therethrough. The hydrocyanic acid liberated, together with excess carbon dioxid and water vapor escapes through a flexible connection 19 to a pipe 20, through which it is conveyed to a moisture condenser 21 preferably comprising a shell 22, having a water chamber 23 and pipes 24 and 25 through which cooling water is introduced and discharged at a proper temperature to preclude condensation of hydrocyanic acid. The mixture of hydrocyanic acid, carbon dioxid and water vapor passes through tubes 26. The moisture is condensed and falls to the receiver 27 while the mixed gases are conveyed through a pipe 28 to an equalizer such as the balloon 29.

From the balloon the gases pass through a pipe 30 to a drier 31 which is preferably filled with sodium bisulfate, calcium chlorid, or other material adapted to separate moisture from the gas. The drier 31 is preferably surrounded by a jacket 32 containing a medium adapted to maintain a temperature sufficiently high, for example, in the neighborhood of from 30° to 50° C., to prevent condensation of hydrocyanic acid. From the drier 31 the gas is conveyed through a pipe 33 to a compressor 34, wherein it is preferably compressed to a suitable pressure to insure ready liquefaction. Compression may, however, be omitted as it is not essential to liquefaction.

A pipe 35 delivers the gas from the compressor 34 to a coil 36 located within a container 37, in which a cooling medium is held at a temperature sufficiently low to condense hydrocyanic acid. The liquefied gas escapes through an outlet 38 to a sight glass 39, and thence to a receiver 40 for the liquid. The receiver 40 is preferably provided with a jacket 41, in which a cooling medium is maintained to prevent evaporation of liquid, which may be withdrawn as desired through an outlet 42. The uncondensed gas, principally carbon dioxid, escapes through a pipe 43 to a pressure storage tank 44, which is connected by a pipe 45 with the pipe 14.

In carrying out the invention, the cyanid-containing material, which as previously noted, may be chemically or commercially pure alkali metal cyanid, or material containing cyanid, is ground and moistened with preferably from 5 to 20 per cent. of its weight of water. In practice the quantity of water employed depends upon the proportion of cyanid in the material treated and should be somewhat in excess of the theoretical quantity necessary to accomplish the desired reactions. The water is preferably added in a suitable mixing device, so that it is thoroughly incorporated with the material which, when moistened as described, is still quite dry in appearance, the moisture being absorbed by the material. A suitable charge of the material is disposed in the chamber 5 on the filter cloth 9, the layer of material being, for example, approximately 10 inches deep. The carbon dioxid is then permitted to enter the chamber at a sufficient pressure to insure the passage of from one and one-half to three times the theoretical quantity of gas required through the layer in from six to twelve minutes. Preferably the gas from the tank 44 is first passed through the converter after which a further quantity is withdrawn from the cylinder 16. This procedure insures that all of the hydrocyanic acid will be blown from the converter and avoids possible danger to operators when the converter is opened.

At the end of the period stated the conversion of the material should be substantially complete, and in fact, it is an essential element of the success of the process that the gas passes the reaction zone at a rate insuring that the hydrocyanic acid formed is immediately withdrawn. It is to be understood that the limits of successful operation are relatively wide and while I have stated a preferred rate of feeding the carbon dioxid, I do not desire to be limited to the specified value, inasmuch as I am apparently the first to have discovered that hydrocyanic acid may be recovered from cyanid-bearing materials in substantially theoretical quantity by passing carbon dioxid through the material at a rate which substantially prevents the formation of polymer in the mass.

From the foregoing description, it will be apparent that I have perfected a method of recovering hydrocyanic acid, from materials containing cyanid, in a very expeditious and highly satisfactory manner. The condensed hydrocyanic acid is clear in color and substantially chemically pure, and may be utilized for a variety of purposes. It may, for example, be stored in suitable containers, vaporized therefrom and employed as an insecticide and germicide. It may be dissolved in water to form solutions from which the gas may be released by heating. The hydrocyanic acid may be utilized in the production of cyanids or formation of compounds involving cyanid reactions by well known methods. Relatively impure materials may be treated in accordance with the process described and their cyanid content thus recovered at a relatively low cost and in a high state of purity.

Various changes may obviously be made in the details of the method without departing from the invention or sacrificing any of the advantages above enumerated, the method and apparatus as hereinbefore described being illustrative merely of the invention which I desire to claim broadly as involving the separation and recovery of hydrocyanic acid from cyanid-containing material, by causing carbon dioxid to react with the material at a rate which insures the separation of the hydrocyanic acid without substantial polymerization, disregarding temperature conditions.

I claim:

1. The method of recovering hydrocyanic acid from solid cyanid-containing material, which comprises, causing carbon dioxid to react with the material, and withdrawing the gaseous end product of the reaction at a rate precluding the substantial polymerization of the hydrocyanic acid.

2. The method of recovering hydrocyanic acid from solid cyanid-containing material, which comprises, passing carbon dioxid through a layer of the material and insuring the passage of the carbon dioxid at a rate which will preclude substantial polymerization of the hydrocyanic acid.

3. The method of recovering hydrocyanic acid from cyanid-containing material, which comprises, arranging a layer of the material in a closed chamber, passing carbon dioxid through the layer of material and withdrawing the gaseous end products of the reaction at a rate precluding the substantial polymerization of the hydrocyanic acid.

4. The method of recovering hydrocyanic acid from cyanid-containing material, which comprises, introducing carbon dioxid to and distributing it through a mass of the material which is in a finely divided condition and withdrawing the gaseous end products of the reaction at a rate which precludes substantial polymerization of the hydrocyanic acid.

5. The method of recovering hydrocyanic acid from cyanid-containing material, which comprises, arranging a layer of the material, and passing carbon dioxid downwardly through the layer at a rate which insures withdrawal of the gaseous end products of the reaction without substantial polymerization of the hydrocyanic acid.

6. The method of recovering hydrocyanic acid from solid cyanid-containing material, which comprises, passing carbon dioxid downwardly through a layer of the material and withdrawing the hydrocyanic acid as rapidly as formed, thus substantially preventing polymerization of the hydrocyanic acid.

7. The method of recovering hydrocyanic acid from cyanid-containing material, which comprises, arranging a layer of the material within a closed chamber upon a foraminous support, and introducing carbon dioxid to the chamber above said layer and at a pressure which insures passage of the carbon dioxid downwardly through the material with sufficient rapidity to substantially prevent polymerization of the hydrocyanid acid.

8. The method of recovering hydrocyanic acid from cyanid-containing material, which comprises, causing a quantity of carbon dioxid, from one and one-half to three times the theoretical quantity required, to pass through the material at a rate insuring removal of the hydrocyanic acid from the reaction zone before substantial polymerization occurs.

9. The method of recovering hydrocyanic acid from cyanid-containing material, which comprises, causing a quantity of carbon dioxid, from one and one-half to three times the theoretical quantity required to pass through the material in from six to twelve minutes.

10. The method of recovering hydrocyanic acid from cyanid-containing material, which comprises, causing carbon dioxid in excess to react with the material, withdrawing the gaseous end product at a rate precluding substantial polymerization of the hydrocyanic acid, separating the hydrocyanic acid from excess carbon dioxid and utilizing the excess carbon dioxid in treating another batch of the material.

11. The method of recovering hydrocyanic acid from cyanid-containing material, which comprises, causing carbon dioxid in excess to react with the material, withdrawing the gaseous end product at a rate precluding substantial polymerization of the hydrocyanic acid, separating the hydrocyanic acid from excess carbon dioxid, utilizing the excess carbon dioxid in treating another batch of the material, and introducing fresh carbon dioxid to the latter batch after preliminary treatment with said excess carbon dioxid.

12. The method of recovering hydrocyanic acid from cyanid-containing material which comprises, causing carbon dioxid in excess to react with the material, withdrawing the gaseous end product at a rate precluding substantial polymerization of the hydrocyanic acid, liquefying and thereby separating the hydrocyanic acid from the excess carbon dioxid and recovering the carbon dioxid for utilization in the treatment of further batches of the material.

In testimony whereof I affix my signature.

FLOYD J. METZGER.